United States Patent Office 3,652,669
Patented Mar. 28, 1972

3,652,669
PREPARATION OF OXALIC ACID
Leonard Levine, Lake Jackson, Tex., assignor to The Dow Chemical Company, Midland, Mich.
No Drawing. Filed Nov. 4, 1970, Ser. No. 86,945
Int. Cl. C07c 51/24
U.S. Cl. 260—538         8 Claims

ABSTRACT OF THE DISCLOSURE

Oxalic acid is prepared by reacting a lower alkylene oxide with concentrated nitric acid.

---

The present invention relates to a novel method for the preparation of oxalic acid and more particularly relates to a method for the preparation of oxalic acid from lower alkylene oxides.

At the present time two methods are commercially practiced to produce oxalic acid. In one such method, sodium formate is heated to about 400° C. to produce sodium oxalate. The sodium oxalate is then converted to calcium oxalate with $Ca(OH)_2$ and finally converted to oxalic acid by reaction of the calcium oxalate with sulfuric acid. The other commonly employed process involves oxidizing carbohydrates such as sucrose or cellulose with nitric acid. Such processes, however, either involve multiple steps and severe conditions or the use of prohibitively long reaction times and the production of a multiplicity of by-products.

It is an object of this invention to provide an improved process fo the production of oxalic acid. A further object is to provide a simple, inexpensive process for the preparation of oxalic acid with the concomitant production of a minimum amount of by-products. These and other objects and advantages of the present process will become apparent from the following detailed description.

It has now been discovered that oxalic acid can be prepared by contacting a lower alkylene oxide with concentrated nitric acid at a temperature of between about 25° C. and about 100° C. and recovering the oxalic acid from the reaction mixture.

The lower alkylene oxides useful in the process of this invention are those alkylene oxides and haloalkylene oxides having from 2 to 3 carbon atoms and including ethylene oxide, propylene oxide and epichlorohydrin. Ethylene oxide is usually preferred, however, because it produces higher yields and less by-products than the other lower alkylene oxides. Such oxides are contacted with concentrated nitric acid in molar proportions of from about 1:2 to about 1:9 with the preferred molar ratios being from about 1:4 to about 1:9 (alkylene oxide to nitric acid). At ratios of less than about 1:2 the reaction is undesirable and lower yields are produced. Ratios of greater than 1:9 can be used but no advantage is gained thereby and larger volumes of material must be handled and separated.

While the manner of contacting the lower alkylene oxide with the concentrated nitric acid is not critical it is usually preferred to add the lower alkylene oxide, in liquid or vapor form, to the required volume of concentrated nitric acid at the desired temperature. The flow rate of the alkylene oxide is thereby a means of controlling the reaction. Due to the exothermic nature of the reaction and the tendency of the oxide to polymerize, it is not recommended to add the acid to the oxide.

The reaction between the alkylene oxide and the concentrated nitric acid is conducted at a temperature of between about 25° C. and about 100° C., preferably between about 40° C. and about 80° C. At temperatures below about 25° C., the reaction is unduly slow and increased yields of nitrated products are produced. At temperatures above about 100° C., yields to oxalic acid are lowered due to excessive oxidation. In general, it is preferred to conduct the reaction at or about atmospheric pressure but pressures above atmospheric pressure are not detrimental.

The reaction time required between the nitric acid and the alkylene oxide is dependent on the temperature employed but in general a reaction time of between about 0.5 hour and about 10 hours is employed with from about 2 to about 4 hours being usually preferred.

As used herein the term "concentrated nitric acid" means those aqueous solutions of nitric acid containing from about 69–72% $HNO_3$ and having a specific gravity of about 1.42.

After the reaction of the lower alkylene oxide with the concentrated nitric acid is complete or has reached the desired level of completion, the oxalic acid is separated from the remainder of the reaction medium. One preferred method to achieve such separation is to cool the reaction mixture to a temperature between about $-10°$ C. and $-20°$ C. to cause precipitation of the oxalic acid product. The product is then separated by a suitable means such as filtration or decantation and purified to the extent required for the desired end use. In general, washing the crystalline oxalic acid with cold concentrated nitric acid and then drying the crystals will produce a product of sufficient purity for most uses. For reasons of economics, it is usually desirable to recover the excess nitric acid and nitrogen oxides for reuse in the process.

A preferred method of operating the process of this invention includes the steps of passing a fluid stream of a lower alkylene oxide through a sufficient quantity of concentrated nitric acid to achieve the desired ratio of alkylene oxide to nitric acid at a temperature between about 25° C. and about 100° C., cooling the reaction mixture to between about $-10°$ C. to $-20°$ C. and maintaining at such temperature until the oxalic acid precipitates from solution. The crystals of oxalic acid are then separated from the solution by filtration, or other suitable means, washed with cold concentrated $HNO_3$ and dried if desired. The filtrate then may be purified, e.g. by extraction, to remove reaction by-products therefrom and the nitric acid returned to the reactor. This process is adaptable to either batch or continuous operation.

The following examples are provided to more fully illustrate the present invention but such specific illustrations are not to be taken as limiting to the scope of the invention.

EXAMPLE 1

A 5-necked, 2-liter flask was employed as the reactor and was equipped with a stirrer, thermometer, water cooled reflux condenser, and a gas dispersion tube which was set so that it would terminate below the level of the liquid in the flask. A steel cylinder containing ethylene oxide (0.98 mole) was joined to a bubbler which was in turn attached to the gas dispersion tube. A cylinder of industrial air was also joined to the gas dispersion tube through a large empty trap and a bubbler and a sidearm led to a bubbler filled with mercury which acted as an indicator for pressure buildup and a release valve in case the tube was blocked. The reflux condenser was joined to a glass tube packed with glass beads through which a constant flow of water was maintained so that all gases escaping from the reaction flask would be picked up by the water.

Concentrated nitric acid (8.9 moles) was placed in the flask and heated to 45° C. with stirring and a slow constant flow of air. Ethylene oxide was then fed into the nitric acid for a period of about 15 minutes. The addition of ethylene oxide was halted and the temperature raised to 80° C.

After a few minutes a brown gas began rapidly to evolve and the temperature rose to 85° C. After this initial induction period, a water bath was used to cool the reaction mixture to 45° C. and the remaining ethylene oxide was added over a period of 2.5 hours. During this period, intermittent use of a water bath was necessary to maintain the temperature between 45 and 50° C. After the ethylene oxide addition had been completed, the reaction mixture was stirred for several hours as it cooled and then allowed to sand for 2.5 days. Brown gas evoled from the reaction mixture during this period and a crystalline precipitate formed in the bottom of the flask. The reaction mixture was then cooled to −15° to −20° C., filtered and the solid product was washed twice with cold concentrated nitric acid. After drying in a vacuum oven, 87 g. of oxalic acid dihydrate was recovered to produce a yield of 71%. The infrared spectra of the product confirmed its identity.

EXAMPLE 2

In the manner of Example 1, ethylene oxide (1.2 moles) was added to concentrated nitric acid (4.7 moles) at a temperature of between 80-90° C. during a 3.2 hr. period. Nitrogen was used in place of air.

The reaction mixture was placed in a freezer at about −15° C. and after several hours, the solid precipitate was collected. The product was dried in a vacuum oven and amounted to a 35% yield of oxalic acid dihydrate; M.P. 187–189° C. The higher temperature at which the reaction was run caused oxidation losses which apparently accounts for the reduced yield of oxalic acid.

EXAMPLE 3

Ethylene oxide (0.98 mole) was reacted with concentrated nitric acid (8.0 moles) during 2 hrs. at 75–80° C. essentially as in Example 1 in the presence of air. The solution was then stirred at 75° C. for 1.3 hours. The reaction mixture was cooled overnight in the freezer. The precipitate was collected and dried in a vacuum oven. The yield of oxalic acid dihydrate was 40%. When nitrogen was substituted for the air, the yield improved to about 50%.

EXAMPLE 4

The equipment and procedure were essentially as in Example 1 except that propylene oxide was substituted for ethylene oxide. The propylene oxide (3.31 moles), was added dropwise to the concentrated nitric acid (12.0 moles) without the presence of a gas stream. There was little reaction during the first few minutes of addition, but then there was a vigorous evolution of brown gas and heat. The addition was halted until the reaction had calmed. The total time of addition was 4 hours at 80–95° C.; it was then maintained at 80–95° C. for 2 hours. Cooling the reaction mixture in the deep freeze and then filtering yielded 40 g. (13%) after drying of oxalic acid; M.P. 181–184° C. The solution was diluted with 1.5 liters of water, and extracted with diethyl ether for 12 hours. The residue from the ether extract after removal of solvent was a mixture of crystalline solid and liquid. The solid was collected. There was 125 g. of solid after drying. A broad range of melting point and analysis by gel permeation chromatography indicated it was impure oxalic acid. The total yield to oxalic acid dihydrate based on theoretical was approximately 40-50%.

EXAMPLE 5

The procedure of E. Fischer and H. Leuchs (Ber. 35 3787 (1902)) was modified. The concentrated nitric acid (12.0 moles) was placed in a flask equipped with a stirrer, thermometer, reflux condenser, and dropping funnel containing epichlorohydrin (3.25 moles). The epichlorohydrin was added dropwise at 60–90° C. during 5 hours. Temperature was difficult to control due to the exothermic nature of the reaction. After about 25 minutes, large quantities of a brown gas was produced suddenly and the temperature climbed rapidly to 95° C. The addition was halted and the reaction allowed to calm before addition was continued. During the remainder of the addition, the brown gas was steadily evolved, and the temperature was controlled by controlling the rate of addition. After standing overnight at room temperature, some crystalline solid was observed in the reaction mixture. The mixture was cooled in the freezer (−15° C.). The solid was collected, washed with cold concentrated nitric acid, and dried. The yield was 45 g. (15%) of oxalic acid; M.P. 186–188° C. The filtrate was diluted with 2.5 times its volume of water, and extracted continuously for 5 hours with diethyl ether.

The aqueous nitric acid solution was concentrated. This yielded a brown liquid. On standing, a solid precipitated which was collected and identified as oxalic acid. The total yield of oxalic acid was 60 g. (21%).

Concentrating the ether extract yielded 185 g. (46%) of yellow liquid which crystallized on standing. Recrystallizing the crude solid from chloroform yielded a white solid; M.P. 69–72° C. The literature (Heilbron and Bunbury, Dictionary of Organic Compounds, London: Eyre and Spottiswoode, 1953) value for the melting point of 3-chloro-2-hydroxypropionic acid is 78° C. The infrared spectra showed the expected carboxylic acid, hydroxyl and chlorine groups, and also showed three carbonyls. These two tests indicated an impure product.

I claim:

1. A process for the preparation of oxalic acid which comprises contacting a lower alkylene oxide with an aqueous solution of nitric acid containing 69–72% nitric acid by adding said lower alkylene oxide to said nitric acid at a temperature of between about 25° C. and about 100° C. and recovering the oxalic acid therefrom.

2. The process of claim 1 wherein the reaction temperature is between about 40° C. and about 80° C.

3. The process of claim 1 wherein the proportion of alkylene oxide to nitric acid is between about 1:2 and about 1:9.

4. The process of claim 1 wherein the reaction time is between about 0.5 and about 10 hours.

5. The process of claim 4 wherein, at the end of the reaction time, the reaction mixture is cooled to a temperature of between about −10 and about −20° C. to cause the oxalic acid to crystallize therefrom.

6. The process of claim 1 wherein the lower alkylene oxide is ethylene oxide.

7. The process of claim 1 wherein the lower alkylene oxide is propylene oxide.

8. The process of claim 1 wherein the lower alkylene oxide is epichlorohydrin.

References Cited

UNITED STATES PATENTS 2,322,915   6/1943   Brooks _____ 260—538

LORRAINE A. WEINBERGER, Primary Examiner

V. GARNER, Assistant Examiner

U.S. Cl. X.R.

260—535 H